No. 716,086. Patented Dec. 16, 1902.
W. T. NICHOLLS.
MANUFACTURE OF GLASS TILES OR SHEETS.
(Application filed May 5, 1902.)
(No Model.)
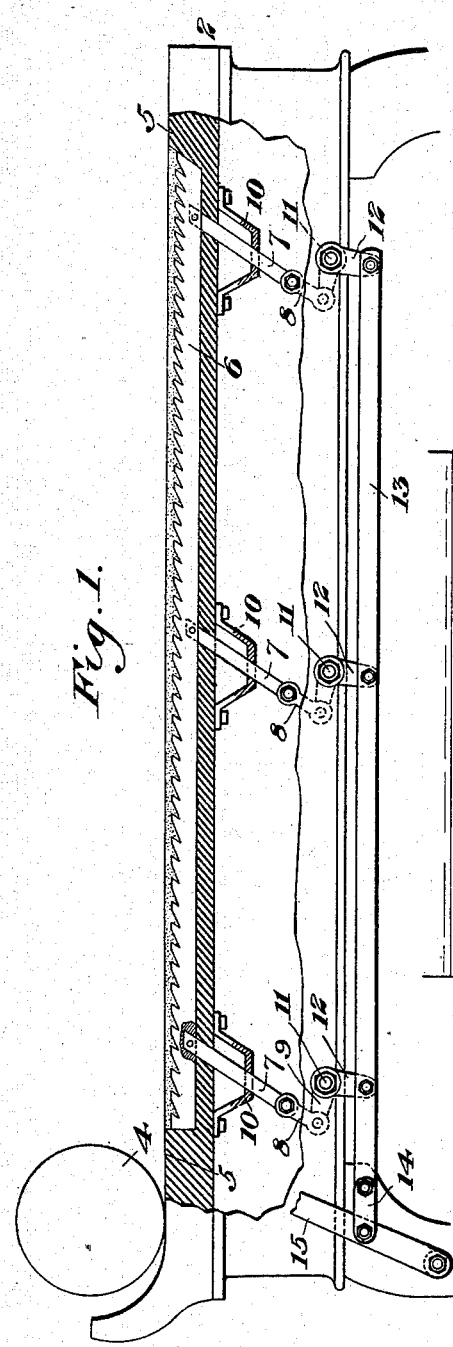
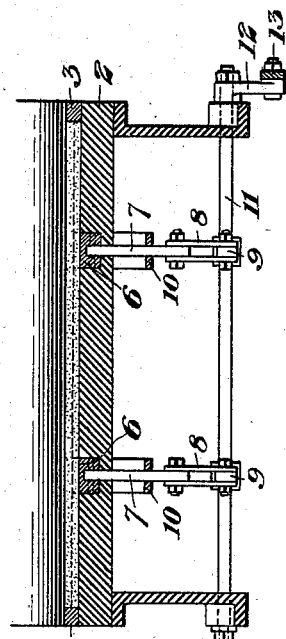
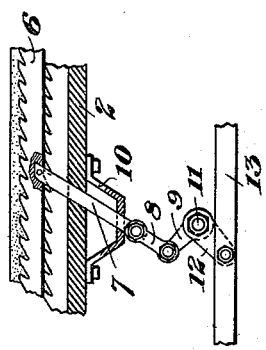
WITNESSES
INVENTOR

UNITED STATES PATENT OFFICE.

WILLIAM T. NICHOLLS, OF WELLSBURG, WEST VIRGINIA.

MANUFACTURE OF GLASS TILES AND SHEETS.

SPECIFICATION forming part of Letters Patent No. 716,086, dated December 16, 1902.

Application filed May 5, 1902. Serial No. 105,946. (No model.)

*To all whom it may concern:*

Be it known that I, WILLIAM T. NICHOLLS, of Wellsburg, in the county of Brooke and State of West Virginia, have invented a new and useful Improvement in the Manufacture of Glass Tiles and Sheets, of which the following is a full, clear, and exact description, reference being had to the accompanying drawings, forming part of this specification, in which—

Figure 1 is a sectional side elevation showing a table for rolling glass constructed in accordance with my invention. Fig. 2 is a vertical cross-section of the same, and Fig. 3 is a detail view showing the lifters in elevated position.

My invention relates to the formation of glass tiles or sheets having undercut projections, and more particularly to the forming of the opaque tiles set forth in my copending application, Serial No. 48,136, filed February 20, 1901.

The object of the invention is to provide for the removal of the glass having undercut projections from the table on which it is rolled; and the invention consists in providing means for lifting the glass in an angular direction, so that the undercut projections will not hold the glass to the table or become bent or distorted in withdrawing the sheet.

In the drawings I show a table having a bed 2 with undercut recesses and having side strips 3 3, on which the roller 4 travels. The bed is also provided with end ledges 5 5, one of which is beveled, as shown, to allow the angular lifting of the sheet. In the receiving portion of the bed of the table I provide a series of longitudinal recesses in which are seated the notched lifting-strips 6. I have shown two of these strips, though any desired number may be used. Each lifting bar or strip is recessed at intervals in its length, and in the recesses are pivoted the upper ends of links 7, whose lower ends are pivotally connected with links 8, secured to levers 9. The links 7 extend parallel with each other and at an angle to the vertical, being guided by inclined slots in the table or bed 2 and by depending hangers or guides 10. The levers 9 are secured to transverse rock-shafts 11, and each rock-shaft is provided at its end with a rock-arm or crank 12, these arms being connected by a long link 13. The link 13 is actuated by a link connection 14 with a hand-lever 15, pivoted to the table-support.

In using the table the opaque glass or other material for the sheet is rolled into sheet form upon the table in the usual manner. During this time the lifting-bars are seated in their recesses, and as the top edges of these bars are notched to correspond with the undercut transverse recesses in the table they do not interrupt or interfere with the formation of the undercut projections. After the sheet is rolled the operator swings the rock-shafts by means of the lever 15, and the lifting-bars are thereby moved upwardly at an angle to the vertical, extending in the direction of the undercut projections on the sheet. The sheet is thus elevated above the table without bending or injuring the projections, and the ordinary fork may be inserted beneath the sheet, which is then taken to the annealing-leer.

The advantages of my invention result from the means for giving the angular lift to the sheet, since in this manner the projections would not interfere with the removal of the sheet and the projections are left intact.

The sheet may be formed of various substances, and many variations may be made in the form and arrangement of the table and lifters without departing from my invention.

I claim—

1. A table for rolling sheets, having undercut recesses, and mechanism for lifting the sheet at an angle to the vertical; substantially as described.

2. A table for rolling sheets, said table having transverse undercut recesses, lifter-bars seated in the table; and mechanism for moving said bars upwardly at an angle to the vertical; substantially as described.

3. A table for rolling glass sheets, said table having transverse undercut recesses, notched lifter-bars seated in longitudinal recesses in the table, and connections arranged to move said bars upwardly at an angle to the vertical; substantially as described.

In testimony whereof I have hereunto set my hand.

WILLIAM T. NICHOLLS.

Witnesses:
GEO. W. MCCLEARY,
GEO. E. WELLS.